(12) United States Patent
Han

(10) Patent No.: US 11,630,674 B2
(45) Date of Patent: Apr. 18, 2023

(54) SMART OVERCLOCKING METHOD CONDUCTED IN BASIC INPUT/OUTPUT SYSTEM (BIOS) OF COMPUTER DEVICE

(71) Applicant: Tai-Sheng Han, New Taipei (TW)

(72) Inventor: Tai-Sheng Han, New Taipei (TW)

(73) Assignee: EVGA CORPORATION, New Taipei (TW)

( * ) Notice: Subject to any disclaimer, the term of this patent is extended or adjusted under 35 U.S.C. 154(b) by 123 days.

(21) Appl. No.: 17/367,154

(22) Filed: Jul. 2, 2021

(65) Prior Publication Data

US 2021/0365269 A1 Nov. 25, 2021

Related U.S. Application Data

(63) Continuation-in-part of application No. 16/058,882, filed on Aug. 8, 2018, now abandoned.

(51) Int. Cl.

| | |
|---|---|
| *G06F 9/44* | (2018.01) |
| *G06F 9/4401* | (2018.01) |
| *G06F 11/30* | (2006.01) |
| *G06F 11/07* | (2006.01) |
| *G06F 1/08* | (2006.01) |
| *G06F 1/14* | (2006.01) |
| *G06F 1/20* | (2006.01) |

(52) U.S. Cl.
CPC .............. *G06F 9/4403* (2013.01); *G06F 1/08* (2013.01); *G06F 1/14* (2013.01); *G06F 1/206* (2013.01); *G06F 9/4406* (2013.01); *G06F 11/076* (2013.01); *G06F 11/3024* (2013.01); *G06F 11/3058* (2013.01)

(58) Field of Classification Search
CPC . G06F 9/4403; G06F 1/08; G06F 1/14; G06F 1/206; G06F 9/4406; G06F 11/076; G06F 11/3024; G06F 11/3058
See application file for complete search history.

(56) References Cited

U.S. PATENT DOCUMENTS

| | | | |
|---|---|---|---|
| 7,382,366 B1 * | 6/2008 | Klock | ...................... G06F 11/24 |
| | | | 714/E11.154 |
| 11,415,627 B2 * | 8/2022 | Zeng | ................. G01R 31/31727 |

(Continued)

*Primary Examiner* — Zahid Choudhury
(74) *Attorney, Agent, or Firm* — Che-Yang Chen; Law Office of Michael Chen

(57) ABSTRACT

The present invention provides a smart overclocking method for a computer device with a multi-core CPU and a basic input/output system (BIOS) where an overclocking database is stored therein, which comprises: booting the computer device, logging in the BIOS and performing an overclocking function; acquiring overclocking parameters from the overclocking database; conducting adjustment/settlement of the clock rate and the voltage of the multi-core CPU based on the overclocking parameters; conducting a Heavy Load Testing (HLT) on the multi-core CPU; reading out working results data of the multi-core CPU and determining whether any of them have exceeded limits. Hence, overclocking can be completed within 10 min. or less, without causing shut down of the computer device, and without causing working temperature or working voltage of multi-core CPU to be higher than 90° C. or 1500 mV during Heavy Load Testing (HLT).

9 Claims, 5 Drawing Sheets

(56) References Cited

U.S. PATENT DOCUMENTS

| | | | | |
|---|---|---|---|---|
| 2010/0070792 A1* | 3/2010 | Xue | ........................ | G06F 11/24 |
| | | | | 713/501 |
| 2014/0136823 A1* | 5/2014 | Ragland | .............. | G06F 9/44505 |
| | | | | 713/1 |
| 2014/0317424 A1* | 10/2014 | Akazawa | ............. | H04B 5/0075 |
| | | | | 307/104 |
| 2021/0405112 A1* | 12/2021 | Partiwala | ............ | G06F 11/0754 |

* cited by examiner

SMART OVERCLOCKING METHOD CONDUCTED IN BASIC INPUT/OUTPUT SYSTEM (BIOS) OF COMPUTER DEVICE

BACKGROUND OF THE INVENTION

1. Field of the Invention

The present invention relates to a smart overclocking method conducted in a basic input/output system (BIOS) of a computer device with a multi-core CPU where an overclocking database is stored in the BIOS, of which the BIOS can evaluate a thermal dissipation environment of a multi-core central processing unit (CPU) and offer one of the optimal proposals for overclocking.

2. Description of the Related Art

When an electronic component in a computer system is delivered, a standard working range is generally defined for the electronic component. Overclocking is a technology capable of increasing the clock speed of an electronic component, with which a working range of the electronic component can exceed the standard working range defined by a manufacturer.

Moreover, in order to operate in a safest and most stable condition, a computer system controls, mainly by a BIOS of a computer, various electronic components of the computer, such that the electronic components all are in standard working ranges defined by manufacturers. However, for a user, overclocking can improve the performance of an electronic component, thereby achieve cost-effectiveness.

In addition, when a working range of the electronic component expands, the performance of the computer system also is accordingly improved. Thus, many users expect to overclock working clock rate of the electronic component to the optimal value, such that the computer system can obtain better performance.

Many methods for overclocking have already been known, in which a software is used to perform overclocking on a computer system, and the use of the software can be further divided as setting in a set mode of a BIOS or performing dynamic overclocking on an operating system. When overclocking is performed in the BIOS, a user needs to log in the BIOS while booting the computer system, so as to make self-adjustment on relevant setting parameters, and the BIOS would record this set of setting parameters before crashing.

When the user reboots the computer system, the computer system operates according to this set of setting parameters, and the user can readjust these setting parameters according to this set of setting parameters recorded in the BIOS. The setting parameters can then be adjusted to the optimized ones after constant attempts and mistakes as well as a series of operational settings.

Although the optimized parameters can be achieved through adjustment, such a method for overclocking needs longtime accumulation of experiences to perform constant calculations and tests, which is rather difficult for a user that is not familiar with the computer system. Furthermore, during overclocking, constant exceeding of the highest working range would resulting in certain damage to respective electrical components and doubts about security.

Therefore, how to solve the existing problems and deficiencies described above represents a direction of research and improvement by the present inventors and relevant manufacturers in the art.

SUMMARY OF THE INVENTION

Hence, in order to effectively solve above problems, a main objective of the present invention is to provide a smart overclocking method conducted in a basic input/output system (BIOS) of a computer device with a multi-core CPU, where an overclocking database is stored in the BIOS, and the BIOS can evaluate a thermal dissipation environment of a multi-core CPU and offer one of the optimal proposals for overclocking.

In order to achieve the above objectives, provided in the present invention is a smart overclocking method conducted in a basic input/output system (BIOS) of a computer device with a multi-core CPU, where an overclocking database is stored in the BIOS.

The method comprises:
  Step 1: booting the computer device, logging in a setting image of the BIOS and performing an overclocking function;
  Step 2: acquiring, according to a model of the multi-core CPU, overclocking operating parameters and overclocking threshold values from the overclocking database of the BIOS, wherein the overclocking parameters comprises a starting clock rate, an ending clock rate, a starting voltage and a starting temperature; the overclocking threshold values comprises maximum clock rate, a voltage upper limit and a temperature upper limit certified by the manufacturer;
  Step 3: performing in real time adjustment of the clock rate and the voltage corresponding to the multi-core CPU based on the overclocking operating parameters acquired from the BIOS;
  Step 4: conducting a Heavy Load Testing (HLT) on the multi-core CPU, and reading out in real time working results data including the working clock rate, the working voltage, and the working temperature of the multi-core CPU;
  Step 5: determining whether the working voltage and the working temperature of the multi-core CPU exceed the voltage upper limit and the temperature upper limit or not;
  Step 6:
    (1) if the working voltage or the working temperature of the multi-core CPU exceeds the voltage upper limit and the temperature upper limit, repeatedly conducting Heavy Load Testing (HLT) of Step 4 by using a new clock rate which is less than the working clock rate obtained by Step 2 to make sure that the computer can be overclocked under the new clock rate, then stopping the another Heavy Load Testing (HLT) and the computer device is deemed as it could be enhanced by overclocking under the new clock rate; or
    (2) if the working voltage and the working temperature of the multi-core CPU do not exceed the voltage upper limit and the temperature upper limit, determining whether the working clock rate of the multi-core CPU approaches the maximum clock rate or not,
      (2a) if the working clock rate of the multi-core CPU approaches the maximum clock rate, then stopping the Heavy Load Testing (HLT) and the computer device is deemed as it could be enhanced by overclocking under the maximum clock rate;
      (2b) if the working clock rate of the multi-core CPU does not approach the maximum clock rate, repeatedly conducting Heavy Load Testing (HLT)

of Step 4 by using new clock rate which is more than the working clocking rate obtained by Step 2 to acquire another working results data of the multi-core CPU; and then repeatedly conducting Steps 5 and 6 to acquire a clock rate that is deemed suitable to the computer device.

Hence, the smart overclocking method achieves the efficacy that the BIOS unit can evaluate a thermal dissipation environment of the multi-core CPU and offer the optimized proposals for overclocking, as well as overclocking of multi-core CPU computer device can be completed within 10 min. or less, without causing shut down of the computer device, and without causing working temperature or working voltage of multi-core CPU to be higher than 90° C. or 1500 mV during Heavy Load Testing (HLT).

DETAILED DESCRIPTION OF THE PREFERRED EMBODIMENTS

Figure 1:
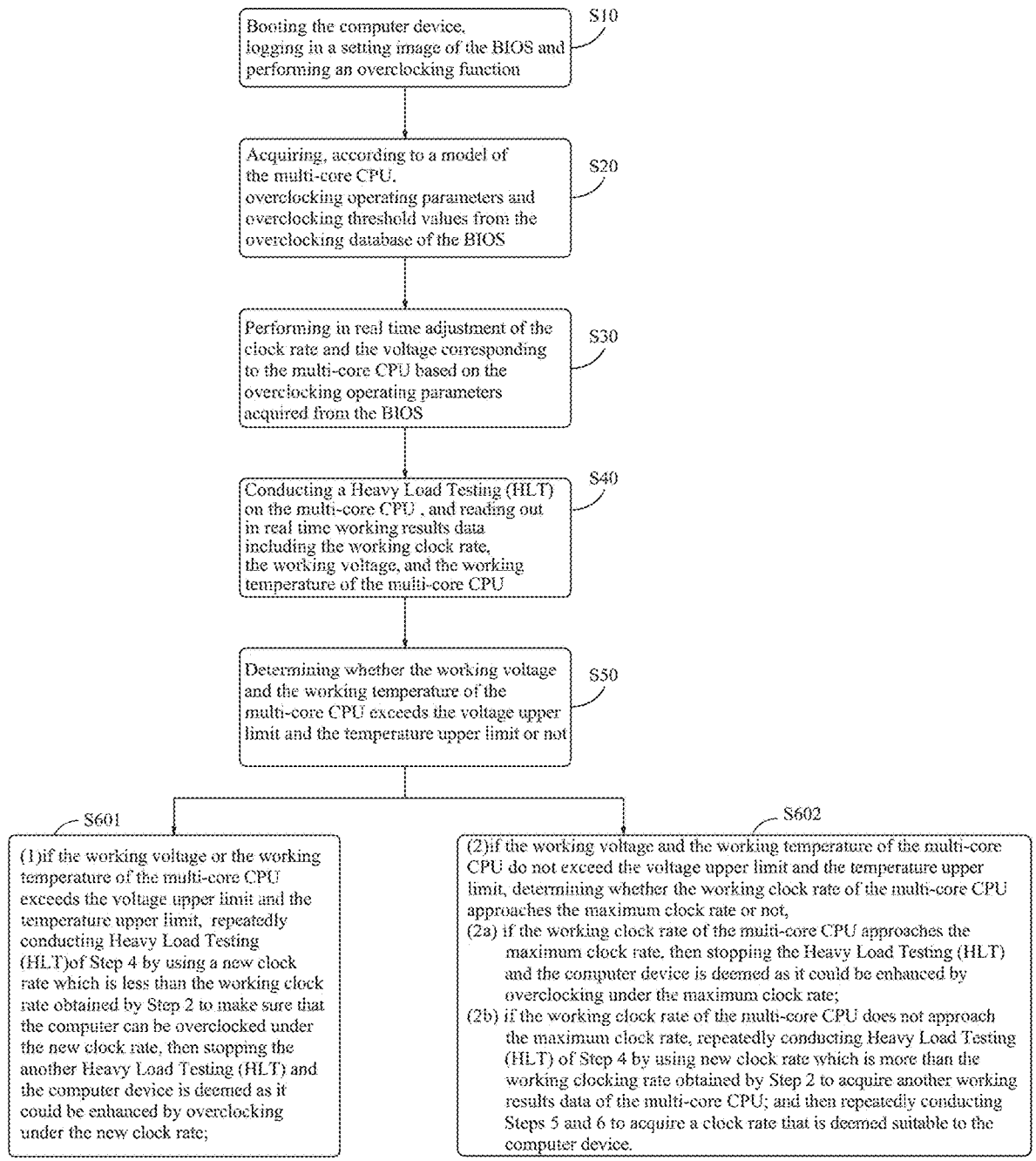
FIG. 1 is a first flow chart of the preferred embodiment of the present invention.
Figure 2:
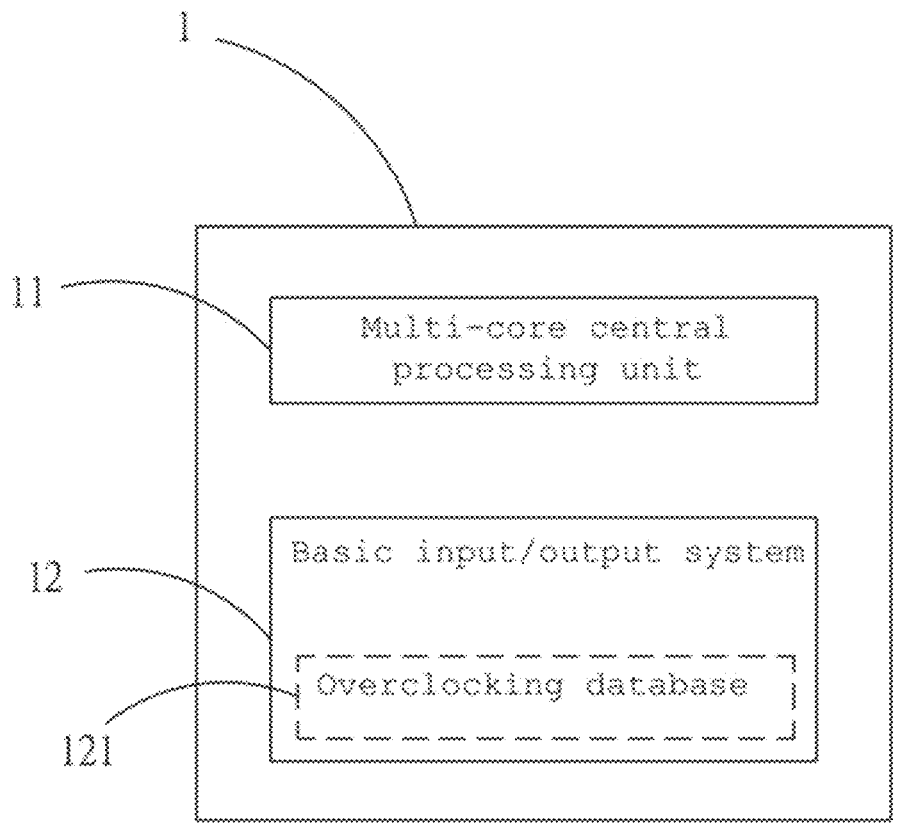
FIG. 2 is a first block schematic view of the preferred embodiment of the present invention.

Referring to FIGS. 1 and 2, a first flow chart and a block schematic view of a preferred embodiment of the present invention are shown, and it can be clearly seen from the figures that a smart overclocking method conducted in a basic input/output system (BIOS) of a computer device with a multi-core CPU, where an overclocking database is stored in the BIOS, wherein, above all, the computer device 1 has a multi-core CPU 11, and the computer device 1 has a BIOS 12, and an overclocking database 121 is built in the BIOS 12.

The overclocking database 121 comprsies multiple overclocking operating parameters that are correspondingly to different models of multi-core CPU 11, and the overclocking operating parameters include safe overclocking operating parameters and stable overclocking operating parameters. That is, various multi-core CPU 11 have different most preferred overclocking operating parameters, and respective multi-core CPU 11 has corresponding overclocking operating parameters, while respective overclocking operating parameters define working clock rate and working voltage thereof.

According to the invention, the method smart overclocking method conducted in a basic input/output system (BIOS) of a computer device with a multi-core CPU, where an overclocking database is stored in the BIOS, comprises:

Step 1 (S10): booting the computer device 11, logging in a setting image of the BIOS 12, and performing an overclocking function. Accordingly, the computer device 11 is booted and the BIOS 12 is logged in, and then a function of conducting automatic overclocking shown on a setting image of the BIOS 12 is selected to be performed.

Step 2 (S20): acquiring, according to the model of the multi-core CPU, the overclocking operating parameters and overclocking threshold values from the overclocking database of the BIOS in the overclocking database; the overclocking parameters comprises a starting clock rate, an ending clock rate, a starting voltage and a starting temperature; and the overclocking threshold values comprises maximum clock rate, a voltage upper limit and a temperature upper limit certified by the manufacturer.

Accordingly, the computer device 1 would first read the model of the multi-core CPU 11, then according to which, the overclocking operating parameters in the overclocking database 121 is retrieved, and the overclocking operating parameters corresponding to the model of the core CPU is acquired, while the corresponding overclocking operating parameters would define the starting clock rate, ending clock rate, operating temperature and operating voltage.

Step 3 (S30): setting the clock rate and the voltage corresponding to the multi-core CPU of the computer device based on the overclocking operating parameters acquired on Step 2 (S20) form the BIOS. The starting clock rate and the operating voltage defined by the corresponding overclocking operating parameters are used as a benchmark, and the starting clock rate and the operating voltage of the multi-core CPU 11 are then adjusted, which are adjusted to the staring clock rate and the operating voltage defined by the overclocking operating parameters.

Step 4 (S40): conducting a Heavy Load Testing (HLT) on the multi-core CPU and reading out in real time working results data including the working clock rate, the working voltage, and the working temperature of the multi-core CPU. The Heavy Load Testing (HLT) is performed on the multi-core CPU 11 with the working clock rate and the working voltage defined by the overclocking parameters, such that the multi-core CPU 11 performs a heavy load operation with a peripheral device of the computer device 1. Briefly, after the Heavy Load Testing (HLT), working results data comprising working clock rate, working voltage, and working temperature of the multi-core CPU 11 presented under the Heavy Load Testing (HLT) are read out in real time.

Step 5 (S50): determining whether the working voltage and the working temperature of the multi-core CPU exceeds the voltage upper limit and the temperature upper limit or not.

Briefly, a determination whether the working results data such as the working clock rate, the working voltage, and the working temperature have exceeded the starting clock rate or ending clock rate, the voltage upper limit, and the temperature upper limit of the multi-core CPU 11 is made.

Step 6 (1) (S601): if the working voltage or the working temperature of the multi-core CPU exceeds the voltage upper limit and the temperature upper limit, repeatedly conducting Heavy Load Testing (HLT) of Step 4 by using a new clock rate which is less than the starting clock rate obtained by Step 2 to make sure that the computer can be overclocked under the new clock rate, then stopping the another Heavy Load Testing (HLT) and the computer device is deemed as it could be enhanced by overclocking under the new clock rate.

Thus, if a determination is made that the working clock rate, the working voltage, and the working temperature of the multi-core CPU 11 presented after the Heavy Load Testing (HLT) have exceeded the maximum clock rate, the voltage upper limit, and the temperature upper limit of the multi-core CPU 11, then an action of order reduction is performed with the working clock rate and the working voltage of the overclocking operating parameters as the benchmark, and the overclocking parameters of the working clock rate and the working voltage after the order reduction is revealed on the BIOS 12, which is available for a user to choose whether to adopt the overclocking operating parameters after the order reduction and to end the function of automatic overclocking.

Step 6 (2) (S602): if the working voltage and the working temperature of the multi-core CPU do not exceed the voltage upper limit and the temperature upper limit, determining whether the working clock rate of the multi-core CPU approaches the maximum clock rate or not. (2a) if the working clock rate of the multi-core CPU approaches the maximum clock rate, then stopping the Heavy Load Testing (HLT) and the computer device is deemed as it could be enhanced by overclocking under the new clock rate; (2b) if the working clock rate of the multi-core CPU does not approach the maximum clock rate, repeatedly conducting Heavy Load Testing (HLT) of Step 4 by using new clock rate which is more than the starting clocking rate obtained by Step 2 to acquire another working results data of the multi-core CPU; and then repeatedly conducting Steps 5 and 6 to acquire a clock rate that is deemed suitable to the computer device.

Thus, if a determination is made that the working clock rate, the working voltage, and the working temperature of the multi-core CPU 11 presented after the Heavy Load Testing (HLT) have not exceeded the upper clock rate limit, the upper voltage limit, and the upper temperature limit of the multi-core CPU 11. That is to say, the overclocking operating parameters thereof cannot achieve the optimized overclocking effect, then the starting clock rate and the operating voltage defined by the other overclocking operating parameters is retrieved to perform adjustment/setting.

In addition, the starting clock rate and the operating voltage defined by the corresponding overclocking operating parameters are used as a benchmark, and the new starting clock rate and the new operating voltage of the multi-core CPU 11 are then adjusted, which are adjusted to the new starting clock rate and the new operating voltage defined by the overclocking operating parameters, and a Heavy Load Testing (HLT) is performed on the multi-core CPU 11 with the new starting clock rate and the new operating voltage defined by the overclocking operating parameters, such that the multi-core CPU 11 performs a heavy load operation with a peripheral device of the computer device 1.

Further, the working clock rate, the working voltage, and the working temperature of the multi-core CPU 11 presented under the Heavy Load Testing (HLT) are read in real time, and a determination whether the working clock rate, the working voltage, and the working temperature have exceeded the maximum clock rate, the voltage upper limit, and the temperature upper limit of the multi-core CPU 11 is made, until the working clock rate, the working voltage, and the working temperature presented have exceeded the maximum clock rate, the voltage upper limit, and the temperature upper limit of the multi-core CPU 11.

Then, a user is allowed to choose whether to adopt the overclocking parameters after the order reduction and to end the function of automatic overclocking, thereby, the smart overclocking method achieves the efficacy of automatic evaluation of a thermal dissipation environment and offer of the optimized proposal for overclocking.

Figure 3:
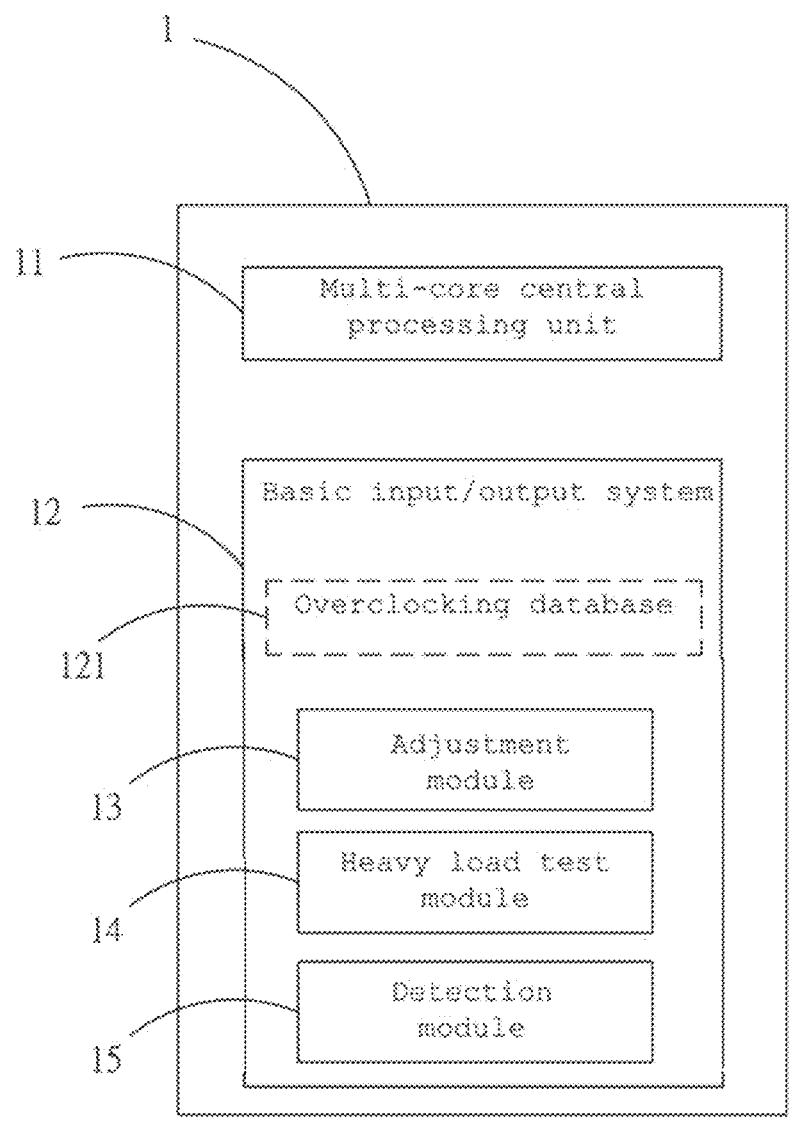
FIG. 3 is a second block schematic view of the preferred embodiment of the present invention.

Referring to FIG. 3, it can be clearly seen from the drawings that a smart overclocking method is conducted in a basic input/output system (BIOS) 12 of the computer device 1. In the BIOS, an adjustment module 13, a heavy load testing module 14, and a detection module 15, wherein the adjustment module 13, the heavy load testing module 14, and the detection module 15 are disposed.

Similarly, in Step 1 (10) to Step 3 (30), booting the computer device, logging in a setting image of the BIOS and performing an overclocking function are firstly done.

Then, acquiring overclocking parameters based on multi-core CPU from the overclocking database of the BIOS, and setting the clock rate and the voltage corresponding to the multi-core CPU of the computer device based on the overclocking parameters acquired form the BIOS were done.

In the invention, wherein the overclocking operating parameters comprises a starting clock rate, an ending clock rate, a starting voltage and a starting temperature; and the overclocking threshold values comprises maximum clock rate, a voltage upper limit and a temperature upper limit certified by the manufacturer.

After then, Step 4 (S40): performing, by the adjustment module 13, adjustment of the clock rate and the voltage of the multi-core CPU with the overclocking parameters.

The adjustment module 13 performs adjustment of the clock rate and the voltage of the multi-core CPU 11 on the multi-core CPU 11 with the overclocking numerical data. Further, the adjustment module 13 adjusts the starting clock rate and the operating voltage of all cores of the multi-core CPU 11, and through the adjustment module 13, the starting clock rate and the operating voltage defined by the corresponding overclocking operating parameters are used as a benchmark, and the starting clock rate and the operating voltage of the multi-core CPU 11 are then adjusted, which are adjusted to the starting clock rate and the operating voltage defined by the overclocking operating parameters.

Moreover, Step 5 (S50) performing, by the heavy load testing module 14, a heavy load testing on the multi-core CPU; and the heavy load testing module 14 performs a heavy load test on the multi-core CPU 11 with the starting clock rate and the operating voltage defined by the overclocking operating parameters, and the heavy load testing module 14 performs the Heavy Load Testing (HLT) on all cores of the multi-core CPU 11, such that the multi-core CPU 11 performs a heavy load operation with a peripheral device of the computer device 1.

Furthermore, reading, by the detection module 15, in real time the working clock rate, the working voltage, and the working temperature of the multi-core CPU and determining whether they have exceeded limits; and the detection module 15 reads in real time the working clock rate, the working voltage, and the working temperature of the multi-core CPU 11 presented under the heavy load testing, and determines whether the working clock rate, the working voltage, and the working temperature have exceeded the maximum clock rate, the voltage upper limit, and the temperature upper limit of the multi-core CPU 11, and the detection module 15 detects the working clock rate, the working voltage, and the working temperature of all cores of the multi-core CPU 11.

If not beyond the limits, the adjustment module 13 retrieves other overclocking operating parameters to adjust the working clock rate and the working voltage, thereby, the smart overclocking method achieves the efficacy that a BIOS unit can automatically evaluate a thermal dissipation environment of a multi-core CPU and offer the optimized proposals for overclocking.

An embodiment is illustrated for more understanding the smart overclocking method for a computer device with a multi-core CPU of the present invention. In the embodiment, a computer device with a multi-core CPU (model number: i9-10900K) is used for overclocking.

The overclocking parameters comprising clock rate, voltage, temperature, starting frequency and ended frequency of clock rate, upper voltage limit, upper temperature limit acquired from the overclocking database of the BIOS are shown on a table below.

| CPU Model | Clock Rate | | Temperature | Voltage |
|---|---|---|---|---|
| | Freq. Start | Freq. End | Temp. Limit | Volt. Limit |
| i9-10900K | 4700 Mhz | 5200 Mhz | 90° C. | 1500 mV |

Figure 4A:
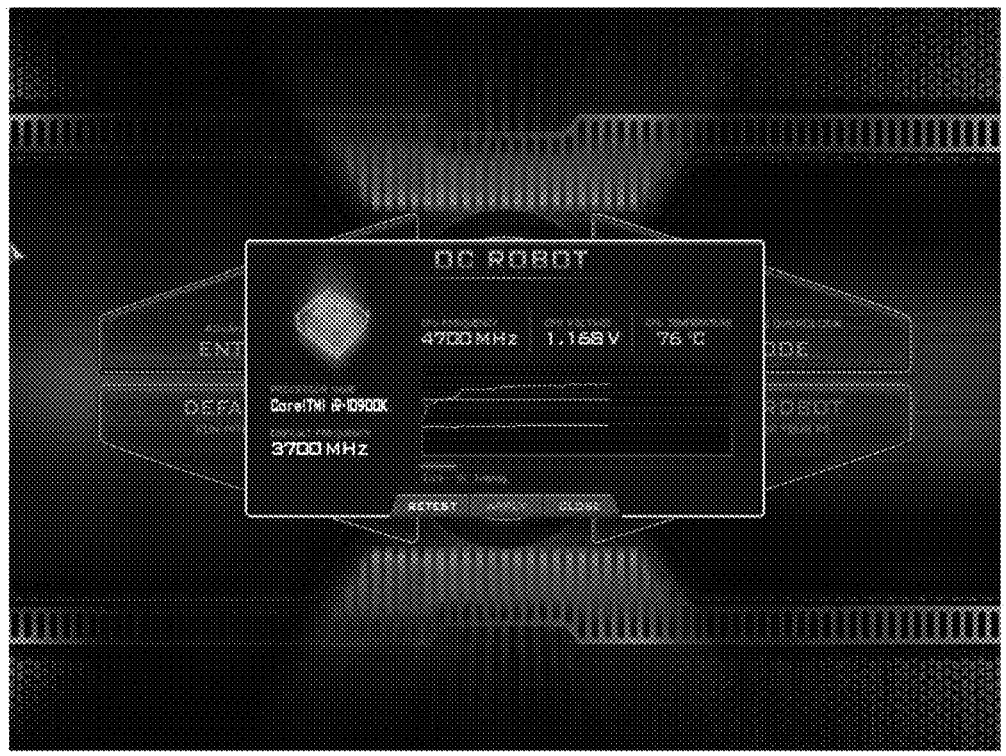
FIG. 4 (A)~FIG. (4D) are BIOS images showing various data values of clock rates, temperature, and voltage of the multi-core CPU under Heavy Load Testing (HLT) in the preferred embodiment of the present invention.

The Heavy Load Testing (HLT) is started from a clock rate (frequency) that was set as 4700 MHz, and working temperature is detected and read out as 76° C., which is shown on the BIOS image of FIG. 4(A).

Figure 4B:
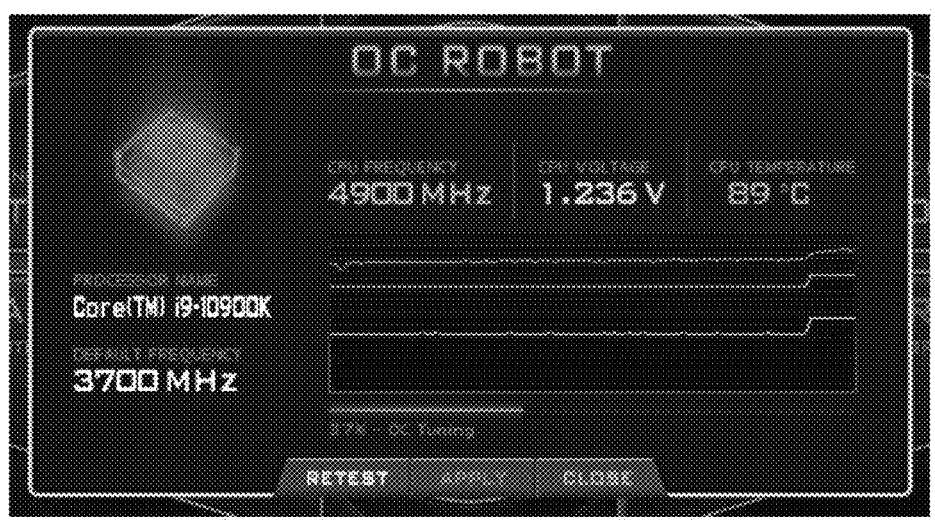

During the new HLT, working temperature is 89° C. at clock rate (frequency) of 4900 MHz as shown on the BIOS image of FIG. 4(B), which is nearby the Temperature Limit set as 90° C.

Figure 4C:
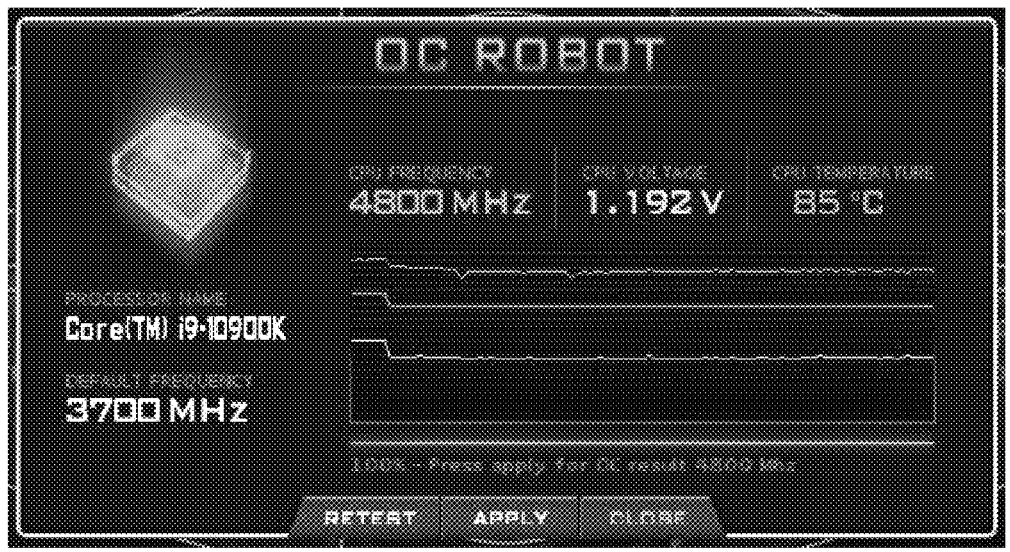

Thus, the clock rate (frequency) of 4900 MHz is deemed as improper for overclocking. Consequently, another new HLT is conducted at a clock rate (frequency) of 4800 MHz, which is smaller than 4900 MHz in one order. During the another new HLT, working temperature is 85° C. at clock rate (frequency) of 4800 MHz as shown on the BIOS image of FIG. 4(C), which is smaller than the Temperature Limit set as 90° C.

Figure 4D:

Thus, in conclusion, the clock rate (frequency) of 4900 MHz is deemed as appropriate for overclocking on the CPU of model number i9-10900K. Then, the user can make his decision on whether overclocking results are to be saved or not. For example, "Do you want to save CPU 2 core for 5300 all core for 4800 MHz setting and reset" is illustrated as shown the BIOS image of FIG. 4(D). It should be set forth that, the above description is merely the preferred embodiment of the present invention, and is not intended to limit the present invention, and without departing from the spirit and scope of the present invention, all changes made according to the inventive concept should fall within the scope of the claims which follow, such as changes of the type of configuration and arrangements, equivalent effects due to all kinds of changes, modifications, and applications, as is set forth above.

What is claimed is:

1. A smart overclocking method conducted in basic input/output system (BIOS) of computer device with a multi-core CPU, where an overclocking database is stored in BIOS, comprising:
   Step 1: booting the computer device, logging in a setting image of the BIOS and performing an overclocking function;
   Step 2: acquiring, according to a model of the multi-core CPU, overclocking operating parameters and overclocking threshold values from the overclocking database of the BIOS, wherein the overclocking operating parameters comprises a starting clock rate, an ending clock rate, a starting voltage and a starting temperature; and the overclocking threshold values comprises maximum clock rate, a voltage upper limit and a temperature upper limit certified by the manufacturer;
   Step 3: performing in real time adjustment of the clock rate and the voltage corresponding to the multi-core CPU based on the overclocking operating parameters acquired from the BIOS;
   Step 4: conducting a Heavy Load Testing (HLT) on the multi-core CPU, and reading out in real time working results data including the working clock rate, the working voltage, and the working temperature of the multi-core CPU;
   Step 5: determining whether the working voltage and the working temperature of the multi-core CPU exceeds the voltage upper limit and the temperature upper limit or not; and
   Step 6:
   (1) if the working voltage or the working temperature of the multi-core CPU exceeds the voltage upper limit and the temperature upper limit, repeatedly conducting Heavy Load Testing (HLT) of Step 4 by using a new clock rate which is less than the working clock rate obtained by Step 2 to make sure that the computer can be overclocked under the new clock rate, then stopping the another Heavy Load Testing (HLT) and the computer device is deemed as it could be enhanced by overclocking under the new clock rate; or
   (2) if the working voltage and the working temperature of the multi-core CPU do not exceed the voltage upper limit and the temperature upper limit, determining whether the working clock rate of the multi-core CPU approaches the maximum clock rate or not,
      (2a) if the working clock rate of the multi-core CPU approaches the maximum clock rate, then stopping the Heavy Load Testing (HLT) and the computer device is deemed as it could be enhanced by overclocking under the maximum clock rate;
      (2b) if the working clock rate of the multi-core CPU does not approach the maximum clock rate, repeatedly conducting Heavy Load Testing (HLT) of Step 4 by using new clock rate which is more than the working clocking rate obtained by Step 2 to acquire another working results data of the multi-core CPU; and then repeatedly conducting Steps 5 and 6 to acquire a clock rate that is deemed suitable to the computer device.

2. The smart overclocking method conducted in BIOS of computer device according to claim 1, wherein an adjustment module is provided in the BIOS to conduct adjustment of the clock rate and the voltage of the multi-core CPU based on the overclocking operating parameters.

3. The smart overclocking method conducted in BIOS of computer device according to claim 1, wherein a heavy load testing module is provided in the BIOS to conduct a Heavy Load Testing (HLT) on each core CPU of the multi-core CPU.

4. The smart overclocking method conducted in BIOS of computer device according to claim 1, wherein a detection module is provided in the BIOS to detect and read out working results data comprising working clock rate, working voltage, and working temperature of the multi-core CPU and determines whether any of them has exceeded overclocking threshold values or not.

5. The smart overclocking method conducted in BIOS of computer device according to claim 2, wherein the adjustment module is provided in the BIOS to retrieves new overclocking operating parameters for conducting a new Heavy Load Testing (HLT).

6. The smart overclocking method conducted in BIOS of computer device according to claim 1, wherein the overclocking can be completed without causing shut down of the computer device.

7. The smart overclocking method conducted in BIOS of computer device according to claim 1, wherein the overclocking can be completed within 10 min. or less and without causing shut down of the computer device.

8. The smart overclocking method conducted in BIOS of computer device according to claim 4, wherein the detection module is provided to detect and read out new working results data comprising working clock rate, working voltage, and working temperature of the multi-core CPU presented under the Heavy Load Testing (HLT), and determines whether any of them has exceeded the overclocking threshold values or not.

9. The smart overclocking method conducted in BIOS of computer device according to claim 1, wherein the overclocking can be completed without causing working temperature of multi-core CPU to be higher than 90° C. and without causing working voltage of multi-core CPU to be higher than 1500 mV during Heavy Load Testing (HLT).

* * * * *